United States Patent [19]

Iritani et al.

[11] Patent Number: 5,547,692
[45] Date of Patent: * Aug. 20, 1996

[54] FERMENTED BAGASSE FEED, AND ITS PREPARATION AND USES

[75] Inventors: Satoshi Iritani, Akaiwa-gun; Masakazu Mitsuhashi, Okayama; Hiroto Chaen, Okayama; Toshio Miyake, Okayama, Japan

[73] Assignee: Kabushiki Kaisha Hayashibara Seitbutsu Kagaku Kenkyujo, Okayama, Japan

[ * ] Notice: The term of this patent shall not extend beyond the expiration date of Pat. No. 5,545,418.

[21] Appl. No.: 364,490

[22] Filed: Dec. 27, 1994

[30] Foreign Application Priority Data

Dec. 27, 1993 [JP] Japan .................................. 5-346948

[51] Int. Cl.$^6$ ........................................................ A23K 1/00
[52] U.S. Cl. ........................................ 426/53; 426/2
[58] Field of Search ........................................ 426/53, 2

[56] References Cited

U.S. PATENT DOCUMENTS 3,903,307  9/1975  Kimura ........................................ 426/53

FOREIGN PATENT DOCUMENTS 1571855  7/1980  United Kingdom .

OTHER PUBLICATIONS

Sneath et al; Bergey's Manual of Systematic Bacteriology; vol. 2; 1986.
Molina et al; *Nutritive Valve for Ruminants of Sugar Cane Bagasse Ensiled After Spray Treatment with Different Levels of Sodium Hydroxide;* Animal Feed Science and Technology; pp. 1–17; 1983.
Playne; *Increased Digestibility of Bagasse by Pretreatmet with Alkalis and Steam Explosion;* Biotechnology & Bioengineering; vol. XXVI; pp. 426–433; 1984.

Primary Examiner—Esther M. Kepplinger
Assistant Examiner—Choon P. Koh
Attorney, Agent, or Firm—Browdy and Neimark

[57]  ABSTRACT

A highly-digestible, preferred taste and high-quality fermented bagasse feed prepared by incorporating a lactic acid bacterium capable of proliferating in an alkaline nutrient culture medium of not less than pH 9.5 or in a nutrient culture medium containing sodium chloride of 6.5 w/w % into an alkali-treated bagasse which is prepared by softening a bagasse while preventing the substantial decomposition of cellulose and hemicellulose, and succeedingly fermenting the resultant mixture, and to its preparation and uses.

11 Claims, No Drawings

FERMENTED BAGASSE FEED, AND ITS PREPARATION AND USES

BACKGROUND OF THE INVENTION

1. Field of the Invention

The present invention relates to a fermented bagasse feed and its preparation and uses, more particularly to a fermented bagasse feed prepared from an alkali-treated bagasse and its preparation as well as uses.

2. Description of the Prior Art

Bagasse, a squeezed waste of sugar cane, contains a vast amount of of cellulose and hemicellulose. Although having been used in part as fuel sources, it is a typical unutilized agricultural waste which could not find other useful applications. The problem is that more than 100 million tons of bagasse produced annually worldwide have been still unutilized.

On the other hand, livestock bred with grass, or ruminants like cattle and sheep, naturally assimilate cellulose and hemicellulose of plants, unlike monogastric animals like human beings, pigs and poultry, and utilize physiologically said cellulose and hemicellulose as energy sources.

Recently, the consumption of livestock products like beef and dairy products has increased and intensive livestock farming system has been remarkably developed so that a lot of cattle standing in the same direction have been bred together in a small shed, and said intensive livestock farming system has tightened the supply of feed grass sufficient for breeding and also led to the rapid increase of the demand for roughage containing cellulose and hemicellulose substitutable for feed grass.

Researches to utilize bagasse as roughage have proceeded for a long time, however, because in addition to cellulose and hemicellulose, bagasse contains a considerable amount of lignin having a tight linkage with fibre like cellulose and also said linkage tightens the structure of bagasse as in bamboo. In case that ruminants could assimilate bagasse itself, the digestibility of bagasse for ruminants is relatively low and the taste and value of bagasse for ruminants is very unpreferable. It is known that when bagasse is assimilated by cattle, there is a danger that pieces of said bagasse could be stuck into the walls of the cattle's rumen.

For improving nutrient value of bagasse, there were many proposals for increasing the digestibility of bagasse by decomposing lignin to soften the structure of bagasse. Many of these proposals comprise treating bagasse with alkali and then fermenting the alkali-treated bagasse. In such alkali treatment, as described in *Biotechnology and Bioengineering*, volume 26, pp. 426–433 (1984), using alkaline reagents such as sodium hydroxide, calcium hydroxide and sodium carbonate is known. In the fermentation of an alkali-treated bagasse, for instance, as described in *Animal Feed Science and Technology*, volume 9, pp. 1–17 (1983), ensilage of an alkali-treated bagasse using sodium hydroxide is known.

We eagerly studied these conventional methods and found that in the case of using sodium hydroxide in an alkali treatment, the pH level of alkali-treated bagasse was decreased very gradually over a long period of time to the range wherein lactic acid bacteria were capable of proliferating, and that further a long period of 25 to 90 days was required for preparing a fermented bagasse feed from said alkali-treated bagasse, and it was found that, in order to avoid said disadvantage and to increase rapidly the pH level of alkali-treated bagasse, said alkali-treated bagasse should be neutralized with an acid solution. Furthermore, it was found that in the case of using sodium hydroxide, a relatively small amount of sodium hydroxide kept the pH of the bagasse mixtures to a relatively-high level because of its strong alkalinity so that lignin could be readily decomposed to soften the structure of bagasse while cellulose and hemicellulose necessary for roughage were also readily decomposed, and that there were many other drawbacks in conventional methods.

It was found that in the case of using calcium hydroxide and sodium carbonate, because of their relatively weak alkalinity, the amounts of alkaline reagents used was increased to the level of about 12 to 30 w/w % to bagasse, on a dry solid basis (the wording of "w/w %" as referred to the invention will be abbreviated as "%" hereinafter) which raised the cost of alkali treatment, while ruminants consumed excessively alkaline reagents and desired a large amount of water so that they should excrete a large amount of urine. Therefore it was found that the above alkali treatment has an extreme drawback to affect physiologically ruminants.

SUMMARY OF THE INVENTION

The present invention provides a high-quality fermented bagasse feed overcoming the above drawbacks and its uses, and considering the vast demands for said fermented bagasse feed, the present invention provides a preparation of said fermented bagasse feed readily at a relatively-low cost and in a relatively-short period.

In order to overcome the above object, we have studied eagerly while paying attention to a seed culture of lactic acid bacteria capable of proliferating in relatively-high pH or high saline concentration culture medium containing an alkali-treated bagasse. As a result, we found that lactic acid bacteria capable of proliferating in alkaline nutrient media of not less that pH 9.5 or in nutrient culture media containing sodium chloride of 6.5% are preferable, and that by inoculating a seed culture of the present lactic acid bacteria into an alkali-treated bagasse, a high-quality fermented bagasse feed can be readily prepared from the alkali-treated bagasse of not less than pH 9, and accomplished the present invention.

DETAILED DESCRIPTION OF THE INVENTION

The present invention utilizes the fermentation process wherein lactic acid bacteria capable of proliferating in nutrient culture media of pH 9.5 or in nutrient culture media containing sodium chloride of 6.5%, preferably, lactic acid bacteria belonging to the genus *Enterococcus* are inoculated. This process is characterized by (1) inoculating a seed culture of lactic acid bacteria in an early stage without neutralization by acid because said lactic acid bacteria are capable of proliferating at a high pH level of not less than 9.5; (2) utilizing as alkali reagents in the case of preparing an alkali-treated bagasse, calcium hydroxide, sodium carbonate and the like capable of alkalizing in a relatively-high concentration, but not limited to sodium chloride capable of alkalizing in a relatively-low concentration, and utilizing arbitrarily calcium oxide together with or without sodium hydroxide as explained thereafter; (3) suitable for a large-scale production of a fermented bagasse feed from an alkali-treated bagasse because of easily controllable, short-period and relatively costless production.

Furthermore, we found that using calcium oxide together with or without sodium hydroxide in an alkali treatment of bagasse is suitable for the preparation of an alkali-treated bagasse and a fermented bagasse feed using said alkali-treated bagasse, and accomplished the present invention. Specifically, we found that using as alkaline reagents calcium oxide either with or without sodium hydroxide has the characteristics of (1) producing an alkali-treated bagasse softened almost without decomposing cellulose and hemicellulose as an effective component of bagasse; (2) attaining the object of an alkali-treatment by using a relatively-small amount of an alkaline reagent in a relatively-short period because calcium oxide is an active alkaline reagent or absorbs water and is exothermic enough to promote alkali reaction; (3) inoculating a seed culture of lactic acid bacteria in an early stage without neutralization by acid because the pH level of an alkali-treated bagasse is decreased relatively rapidly; (4) suitable for a large-scale production of an alkali-treated bagasse and a fermented bagasse feed using said alkali-treated bagasse because of easily controllable, short-period and relatively costless production; (5) preferable nutritionally for ruminants because a relatively-small amount of alkaline reagents relative to bagasse is used without considering the excess intake of alkaline reagents and because the nutritive value of bagasse is intensified by adding thereto an appropriate amount of calcium or minerals; and (6) a fermented bagasse feed obtainable by the present invention has a relatively-high quality and excellent digestibility and good taste.

The present invention is described in detail as follows:

The bagasse usable in the present invention is prepared usually as follows; a bagasse having a water content of about 40 to 50% as exhausted in sugar refineries can be employed; if necessary, a dried and stored bagasse can be used. A preferable water content coexisted in an alkali-treatment is in the range from the lower limit wherein both bagasse and alkaline reagents could be mixed sufficiently to the upper limit wherein an alkali solution is prevent from leaking out of an alkali-treated bagasse. Specifically, the water content of about 40 to 90%, desirably, that of about 45 to 80% is more suitable.

In the case of using calcium oxide as alkaline reagents in the present invention, those having a higher activity, namely, those free of water as much as possible are desirable, which can be in the form of granules or powder, if necessary. The amount of calcium oxide suitably used in the invention is in the range of not exceeding 5% of the bagasse, preferably, in the range of 2 to 4%, on a dry solid basis (d.s.b.). The amount of sodium hydroxide used together with calcium oxide suitably used in the invention is in the range of not exceeding the amount of said calcium oxide, preferably, not more than 3%.

In the case of adding alkaline reagents to a bagasse in the presence of water, any method of mixing alkaline reagents with the bagasse containing a certain amount of water can be favorably employed, for example, at first, bagasse is macerated and then mixed with alkaline reagents, or vice versa ad libitum. These procedures can be conducted at an ambient temperature, usually, a temperature in the range of about 10° to 35° C.

The initial pH level of the bagasse thus obtained is usually not less than about pH 10.3, favorably, in the range of about pH 10.5 to 12, and by allowing said bagasse to stand at an ambient temperature, an alkali-treated bagasse having not more than pH 10, preferably, not more than pH 9.5 is readily obtainable, and thus the object of alkali-treatment is attained in a short time of about 10 to 40 hours.

The alkali-treated bagasse thus obtained by using calcium oxide is softened without substantially damaging the cellulose and hemicellulose, particularly, in the case of using calcium oxide together with sodium hydroxide, as compared with the single use of calcium oxide, the lignin of the alkali-treated bagasse is decomposed sufficiently to soften further its structure without damaging effective components of cellulose and hemicellulose, and is a suitable raw material of fermented bagasse feed.

The alkali-treated bagasse usable for the preparation of a fermented bagasse feed in the present invention is allowed to use as alkaline reagent the above calcium oxide and known alkaline reagents, for instance, one or more members of the group consisting of sodium hydroxide, calcium hydroxide and sodium carbonate.

For the purpose of preparing a fermented bagasse feed from an alkali-treated bagasse, said purpose is easily attainable by adding a seed culture of lactic acid bacteria and nutrients to the alkali-treated bagasse and then fermenting the mixture after or immediately before the pH level of the alkali-treated bagasse decreases to a pH range wherein a seed culture of lactic acid bacteria proliferates. In such a case, if necessary, an alkali-treated bagasse can be partially neutralized with an acid solution to meet the minimum pH level for the proliferation of lactic acid bacteria inoculated.

The lactic acid bacteria usable in the present invention include those capable of fermenting in an alkaline nutrient culture medium of not less that pH 9, desirably, not less that pH 9.5 and containing an alkali-treated bagasse, preferably, those of the genera *Enterococcus* are preferable. Specifically, *Enterococcus faecium* HL-5 (FERM BP-4504) belonging to the genus *Enterococcus* newly isolated by the present inventors, which is capable of proliferating and producing lactic acid in alkaline solutions of not less than pH 9.5 or in high concentration saline solutions containing 6.5% sodium chloride to decrease the pH level of alkali-treated bagasse, is suitable for preparing a fermented bagasse feed having a highly increased preference.

We found that the present microorganism is capable of proliferating in alkaline nutrient media of not less than pH 9 containing an alkali-treated bagasse, desirably, those having a pH not less than 9 to a pH not more than 10, more desirably, not less than 9.5 to a pH not more than 10, and said microorganism can be seeded at a relatively early stage, in other words, a desirable alkali treatment period can be 1 to 2 days or less. Furthermore the microorganism is characterized in that it satisfactorily shortens the preparation period of a fermented bagasse feed to about 3 to 6 days. When inoculated into the alkali-treated bagasse with calcium oxide whose pH level readily decreases, the microorganism advantageously further shortens the production period of fermented bagasse feed.

The results of identification study of the microorganism, the genera *Enterococcus* HL-5 newly isolated from ensiled corns by the present inventors, are shown as follows. The identification study was conducted according to *Biseibutsu no Bunrui to Doutei* (Classification and Identification of Microorganism)(Edited by Hasegawa, Gakujyutsu Shutsupan Center, 1985).

[A. Morphology]

(1) Characteristics of cells when incubated at 37° C. in MRS agar

Usually existing in a coccus form of 0.9 to 1.2 µm;

Existing in a coupled- or short linked-form;

Motility: Negative;
Asporogenicity; and
Gram stain: Positive.

(2) Characteristics of cells when incubated at 37° C. in PG agar

Usually existing in a coccus form of 0.9 to 1.2 μm;
Existing in a coupled- or short linked-form;
Motility: Negative
Asporogenicity; and
Gram stain: Positive.

[B. Cultural properties]

(1) Characteristics of colony formed when incubated at 37° C. in MRS agar plate
  Shape: Circular colony having a diameter of about 1 to 2 mm after 3 days incubation;
  Rim: Entire;
  Projection : Hemispherical shape;
  Gloss: Wet-look gloss;
  Surface: Smooth; and
  Color: Milk white and semitransparent.
(2) Not liquefying MRS gelatin when stab cultured at 37° C.
(3) Forming acid and gelatinizing litmus milk when incubated therein at 37° C.

[C. Physiological properties]

(1) Catalase: Negative
(2) Oxidase: Negative
(3) Liquefaction of gelatin: Negative
(4) Hydrolysis of casein: Negative
(5) Hydrolysis of arginine: Positive
(6) Tolerance to 40% bile: Positive
(7) Hemolysis: Negative
(8) Hydrolysis of hippurate: Positive
(9) Hydrolysis of aesculin: Positive
(10) Growth at 10° to 45° C.: Positive
(11) Growth at pH 9.6: Positive
(12) Growth in 6.5% NaCl: Positive
(13) Oxygen requirements: Facultative an anaerobic
(14) Acid formation from carbon source
  Amygdalin: Positive
  Arabinose: Positive
  Cellobiose: Positive
  Aesculin: Positive
  Fructose: Positive
  Galactose: Positive
  Glucose: Positive
  Gluconic acid: Positive
  Lactose: Positive
  Maltose: Positive
  Mannitol: Positive
  Mannose: Positive
  Melezitose: Negative
  Melibiose: Positive
  Raffinose: Positive
  Rhamnose: Positive
  Ribose: Positive
  Salicin: Positive
  Sorbitol: Negative
  Sucrose: Positive
  Trehalose: Positive
  Xylose: Negative
  Arbutin: Positive
  Sorbose: Negative
(15) Main diamino acids of cell walls: Lysine
(16) Mol % glycine (G) plus cytosine (C): 38.6%

The above bacteriological properties were compared with those of known strains with reference to *Bergey's Manual of Systematic Bacteriology*, volume 2 (1986). As a result, based on the above properties, it was revealed that the microorganism was identified with a microorganism of the species of *Enterococcus faecium except* for the property that acid formation from sorbose was negative.

On the basis of the above result, the present inventors designated the microorganism as a novel microorganism *Enterococcus faecium* HL-5 and, on the date of Dec. 17, 1993, deposited it in the National Institute of Bioscience and Human-Technology Agency of Industrial Science and Technology located at 1–3, Higashi 1 chome Tsukuba-shi Ibaraki-ken, and it was given the deposit number of FERM BP-4504. In the present invention, addition to the above microorganism, the other strains belonging to the genus *Enterococcus*, which are capable of proliferating in an alkali medium containing an alkali-treated bagasse and having not less than pH 9.5 or in a nutrient culture medium containing 6.5% sodium chloride as well as an alkali-treated bagasse, and also their mutants are utilizable preferably. The other strains belonging to the genus *Enterococcus* usable in the present invention include, for instance, *Enterococcus casseliflavus* IFO 3531, *Enterococcus durans* IFO 13131, *Enterococcus faecalis* IFO 3791, *Enterococcus faecium* IFO 3535 and *Enterococcus hirae* IFO 3181T.

It was found that, similarly to *Enterococcus faecium* HL-5 isolated by the present inventors, lactic acid bacteria belonging to the genera *Enterococcus* are capable of proliferating in a relatively early stage of the pH decrease of alkali-treated bagasse, specifically, not less than pH 9, desirably, capable of proliferating sufficiently in the stage of not less than pH 9.5, and realize an early stage inoculation, and therefore the lactic acid bacteria are suitable for shortening the fermentation period.

The combination use of a lactic acid bacterium belonging to the genus *Enterococcus* and one or more members selected from lactic acid bacteria belonging to the genera *Lactobacillus*, *Pediococcus* and *Streptococcus* which are capable of proliferating at a relatively-low pH of less than and closer to 8 is extremely desirable for the production of a high-quality fermented bagasse feed having an excellent feed taste wherein the production period is shortened.

The strains belonging to the genera *Lactobacillus* include, for instance, *Lactobacillus rhamnosus* IFO 3532, *Lactobacillus plantarum* IFO 3070, *Lactobacillus sake* IFO 3541, *Lactobacillus acidophilus* IFO 13952, *Lactobacillus helveticus* IFO 3809 and *Lactobacillus brevis* IFO 3345, and the combination use of one or more of said strains are suitable for improving the preference of fermented bagasse feeds.

Furthermore, microorganisms belonging to the genera *Pediococcus* and *Streptococcus*, for instance, *Pediococcus acid ilactici* IFO 3076 and *Streptococcus bovis* IFO 12057 are utilizable advantageously.

An alkali-treated bagasse can be fermented by incorporating a seed culture of lactic acid bacteria and nutrients to the alkali-treated bagasse, usually, by adding nutrients, if necessary, together with an appropriate amount of water to said alkali-treated bagasse, inoculating a seed culture of lactic acid bacteria and succeedingly fermenting the mixture at an ambient temperature, desirably, in the range of about 15° to 50° C., for instance, such a fermentation can be attainable by fermenting anaerobically for about 2 or 4 days the above mixture contained in a flexible bag or lapped.

The nutrients usable in the invention include those which are useful for the proliferation of lactic acid bacteria and/or for animals assimilating the fermented bagasse feed obtainable by the present invention, usually, one or more sources of energy, protein, mineral and vitamin can be used. More practically, for instance, molasses, sugar, dextrose, starch, organic acids, alcohols, press-ground grain, sorghum, barley, barley bran, pulverized rice, rice bran, wheat flour, wheat flour bran, corn, corn gluten, feed in general, de-fatted soybean, soybean casein, cottonseeds, cottonseed lees, rape seed lees, beer lees, milk, de-fatted dry milk, milk casein, milk serum, blood meal, bone meal, feather meal, fish meal, urea, ammonium salts, calcium salts, magnesium salts, sodium salts, phosphates, iron salts, copper salts, zinc salts, water-soluble vitamins and lipid-soluble vitamins are arbitrarily usable.

Preferably, the above nutrients are incorporated usually in the range of not exceeding the amount of used bagasse, d.s.b. The wording of "incorporating an appropriate amount of water" as referred to the present invention" means to incorporate the water into the contents in the range from the lower limit proceeding lactic acid fermentation to the upper limit preventing nutrient solutions from leaking out of the resultant fermented bagasse feed, usually in the range of about 40 to 90%, desirably about 45 to 80%, and in the case of putting priority on preservation of the fermented bagasse feed, the water content of about 45 to 60% is suitable. The kind and amount of nutrients used in the fermentation can be selected arbitrarily depending on the final products, for instance, roughage or well-balanced feeds containing nutrients proportionately. The fermented bagasse feeds thus obtained are acidified by lactic acid and excellent in preservation and taste, although these properties are variable dependence on the kind and amount of nutrients used. If necessary, it is feasible advantageously that in order to improve the preservation of said fermented bagasse feed, they are dried by air or hot air to give a water content of not more than 40%, preferably, to decrease said water content to not more than 30% and then the fermented bagasse feed dried thus are readily preserved and utilized.

The fermented bagasse feeds thus obtained in the present invention are high-quality feeds having good taste and excellent digestibility. The fermented bagasse feeds are utilizable mainly as a feed for ruminants, if necessary, for monogastric animals like pigs and poultry, specifically, said bagasse feeds are usable as a feed capable of controlling and improving intestinal conditions and of preventing intestinal infections. Usually cattle assimilate the present fermented feed of about 4 to 20 kg or more in a day, the cattle increase their body weights by not less than about 2 kg/body in a day, preferably, not less than about 2.5 kg/body, depending on the kind of fermented bagasse feed and the ages of the cattle.

It is feasible advantageously that, depending on the kind of animals to be fed and their ages, the present bagasse feed can be arbitrarily mixed with other nutrients.

The following experiments explain the present alkali treatment of bagasse with calcium oxide in detail:

Experiment 1

Effect of alkaline reagent on the preparation of alkali-treated bagasse

Bagasse was macerated with water to give a water content of 70% and mixed with as an alkaline reagent 3, 5 or 7% sodium hydroxide (NaOH) to bagasse, d.s.b., respectively and 2, 3, 5, or 7% calcium oxide (CaO) to bagasse, d.s.b., respectively as uniformly as possible, and the mixture was allowed to stand at ambient temperature. The alkali-treated bagasse thus obtained was analyzed on its changes of pH and components as well as its structural flexibility.

The pH level of the alkali-treated bagasse sampled immediately after the mixing and at 24 and 48 hours termination. The samples were analyzed by admixing 1 part by weight of an alkali-treated bagasse specimen with 2 parts by weight of refined water, allowing the mixture to stand for 10 minutes, filtering the resultant mixture, and measuring the pH of the resultant filtrated on a pH meter. As to components, a raw material of bagasse and the alkali-treated bagasse collected at 24 and 48 hours termination were respectively divided into 8 samples, and their contents of hemicellulose, cellulose and lignin were determined and their average values calculated.

The above measurement was conducted in accordance with the Van Soest's detergent filter method as described in the 3.1 chapter of "Dietary Fiber", pp. 38 to 46 (1982), published by Dai-ichi Shutupan Co., Ltd., Tokyo, Japan. The components of raw bagasse essentially consisted of 28.7% hemicellulose, 52.6% cellulose and 11.9% lignin, d.s.b.

The structural flexibility of the alkali-treated bagasse was analyzed by studying its touch as clutched by a hand wearing thin rubber gloves. The results were tabulated in Table 1.

In Table 1, numerical values pertaining to the item of hemicellulose, cellulose and lignin are designated as a ratio of the remaining hemicellulose, cellulose and lignin after alkali treatment as compared to their initial contents in a raw material of bagasse respectively.

As stated in Table 1, sodium hydroxide used conventionally tends to decrease the pH slowly in comparison with calcium oxide. As to the change of components of bagasse, it was revealed that cellulose and hemicellulose important for roughage are remarkably decomposed and spoiled by using sodium hydroxide.

On the contrary, it was found that an alkali-treated bagasse with calcium oxide, free of substantial decomposition of cellulose and hemicellulose, is advantageously used for a raw material of feeds. As to the flexibility, each sample of the alkali-treated bagasse was flexible sufficiently.

As shown in the above results, it was found that using calcium oxide as alkali reagents for the alkali treatment of bagasse is very suitable.

Furthermore the alkali-treated bagasse with calcium oxide, decreasing its pH level relatively rapidly to the range wherein lactic acid bacteria for the production of fermented bagasse feed are proliferative and making it possible to inoculate into the bagasse lactic acid bacteria at a relatively early stage, is preferably suitable for a

TABLE 1

| Alkali (%) | Time (hr) | | | | | | | | | | |
|---|---|---|---|---|---|---|---|---|---|---|---|
| | 0 | 24 | | | | | 48 | | | | |
| | pH | pH | HC | C | L | F | pH | HC | C | L | F |
| Control | | | | | | | | | | | |
| NaOH | | | | | | | | | | | |
| 3 | 10.8 | 10.3 | 79.4 | 93.5 | 75.3 | Good | 10.0 | 72.3 | 91.5 | 74.5 | Good |
| 5 | 11.3 | 10.7 | 65.7 | 88.2 | 72.8 | Good | 10.3 | 59.8 | 85.4 | 71.4 | Good |
| 7 | 12.4 | 11.5 | 53.6 | 81.3 | 66.4 | Good | 11.0 | 37.7 | 78.6 | 54.6 | Good |
| The present invention | | | | | | | | | | | |
| CaO | | | | | | | | | | | |
| 2 | 10.4 | 8.9 | 99.2 | 99.3 | 82.2 | Good | 8.5 | 99.1 | 99.2 | 80.2 | Good |
| 3 | 10.7 | 9.3 | 98.1 | 99.5 | 80.6 | Good | 8.7 | 98.0 | 98.1 | 79.0 | Good |
| 5 | 11.2 | 10.4 | 97.4 | 97.4 | 77.5 | Good | 10.0 | 96.1 | 97.3 | 75.6 | Good |
| 7 | 11.9 | 11.2 | 91.6 | 94.8 | 75.2 | Good | 10.5 | 90.3 | 93.6 | 74.4 | Good |

HC: hemicellulose,
C: cellullose,
L: lignin, and
F: flexibility
*Numerical values (%) pertaining to hemicellulose, cellulose and lignin mean the ratios of the remaing hemicellulose, cellulose and lignin compared to their initial contents in raw bagasse.

raw material of fermented bagasse feed.

Experiment 2

Effect of the combination of calcium oxide and sodium hydroxide on alkali-treated bagasse In accordance with the method of Experiment 1, bagasse was macerated to give a water content of 70%, the macerated bagasse was mixed with 2 or 3% calcium oxide (CaO) relative to bagasse, d.s.b., and 1, 2 or 4% sodium hydroxide (NaOH) relative to bagasse, d.s.b., respectively, and the alkali-treated bagasse thus obtained was studied on its changes of pH and components as well as its structural flexibility. The results were tabulated in Table 2.

As stated in Table 2, it was unexpectedly found that the use of a combination of calcium oxide and sodium hydroxide as alkaline reagents provided the similar advantageous result as Experiment 1 using only calcium oxide. In other words, each sample of alkali-treated bagasse in Experiment 2 was sufficiently flexible without decomposing cellulose and hemicellulose similarly as in the case of using only calcium oxide.

Specifically, it was revealed that incorporating sodium hydroxide in the range of not exceeding the amount of calcium oxide used allows the effective components of cellulose and hemicellulose in a bagasse to remain sufficiently and also lignin to decompose, and the bagasse thus alkali-treated is flexible sufficiently and suitable for an alkali-treated bagasse.

For the purpose of explaining the present invention in detail, the following examples illustrate the preparations of alkali-treated bagasse, but are by no means limitative of the present invention:

Example 1

Bagasse was macerated to give a water content of 70% and the to resultant was added 4% calcium oxide to bagasse,

TABLE 2

| Alkali (%) | | Time (hr) | | | | | | | | | | |
|---|---|---|---|---|---|---|---|---|---|---|---|---|
| | | 0 | 24 | | | | | 48 | | | | |
| CaO | NaOH | pH | pH | HC | C | L | F | pH | HC | C | L | F |
| 2 | 1 | 10.8 | 9.4 | 94.4 | 99.5 | 79.7 | Good | 9.0 | 98.5 | 99.1 | 78.3 | Good |
| 2 | 2 | 11.1 | 10.3 | 99.1 | 99.3 | 77.0 | Good | 9.6 | 98.2 | 98.4 | 75.0 | Good |
| 2 | 4 | 12.0 | 11.3 | 78.6 | 95.4 | 73.4 | Good | 10.4 | 76.6 | 93.5 | 70.2 | Good |
| 3 | 1 | 11.0 | 10.1 | 98.5 | 99.3 | 77.4 | Good | 9.1 | 97.2 | 99.2 | 76.2 | Good |
| 3 | 2 | 11.6 | 10.4 | 98.2 | 98.1 | 75.0 | Good | 9.7 | 97.1 | 99.1 | 74.3 | Good |
| 3 | 4 | 12.0 | 11.3 | 74.6 | 92.4 | 72.2 | Good | 10.4 | 72.5 | 90.2 | 68.7 | Good |

HC: hemicellulose,
C: cellullose,
L: lignin, and
F: flexibility
*Numerical values (%) pertaining to hemicellulose, cellulose and lignin mean the ratios of the remaing hemicellulose, cellulose and lignin compared to their initial contents in raw bagasse.

d.s.b. and allowed to stand overnight to obtain an alkali-treated bagasse having about pH 9.7. A seed culture of *Enterococcus faecium* FERM BP-4504 was inoculated into a nutrient culture medium containing 100 parts by weight of the alkali-treated bagasse obtained thus, 10 parts by weight of molasses, 0.2 parts by weight of urea and 0.2 parts by weight of salt as nutrients, and the mixture was covered with a plastic sheet and fermented at a room temperature for 2 days to obtain a fermented bagasse feed.

The bagasse feed, sufficiently digestible, is preferably suitable as a high-quality feed having an excellent taste for ruminants. It is advantageously feasible to increase the feed value of the bagasse feed and to produce a feed for monogastric animals like pigs and poultry by blending other nutrients with the fermented bagasse feed.

Example 2

Bagasse was macerated to give a water content of 70%, and the resultant macerated bagasse was mixed with as alkaline reagents 3% sodium hydroxide to bagasse, d.s.b., and the mixture was allowed to stand overnight to obtain an alkali-treated bagasse having about pH 10.3.

Similarly as the product in Example 1, a seed culture of *Enterococcus faecium* FERM BP-4504 was inoculated into a nutrient culture medium containing 100 parts by weight of the alkali-treated bagasse thus obtained, 10 parts by weight of molasses and 0.2 parts by weight of urea as nutrients, and the mixture was fermented similarly as in Example 1 to obtain a fermented bagasse feed.

The bagasse feed, sufficiently digestible, is preferably suitable as a high-quality feed having an excellent taste for ruminants. It is advantageously feasible to increase the feed value of the bagasse feed and to produce a feed for monogastric animals like pig and poultry by blending other nutrients to the fermented bagasse feed.

Example 3

Bagasse was macerated to give a water content of 60%, and the resultant macerated bagasse was mixed with as alkaline reagents 6% calcium hydroxide and 1% sodium hydroxide to bagasse, d.s.b. respectively, and the mixture was allowed to stand overnight to obtain an alkali-treated bagasse having about pH 10.4. Seed cultures of *Enterococcus casseliflavus* IFO 3531 and Lactobacillus plantarum IFO 3070 were inoculated into a nutrient culture medium containing 100 parts by weight of the alkali-treated bagasse thus obtained and as nutrients 20 parts by weight of wheat flour bran, 10 parts by weight of molasses, 0.2 parts by weight of ammonium phosphates and 40 parts by weight of water, the mixture was fermented similarly as in Example 1 to obtain a fermented bagasse feed.

The bagasse feed, sufficiently digestible, is preferably suitable as a high-quality feed having an excellent taste for ruminants. It is advantageously feasible to increase the feed value of the bagasse feed and to produce a feed for monogastric animals like pig and poultry by blending other nutrients to the fermented bagasse feed.

Example 4

Bagasse having a water content of about 47% was mixed with as alkaline reagents 3% calcium oxide and 2% sodium hydroxide to bagasse, d.s.b., respectively, and the mixture was allowed to stand overnight to obtain an alkali-treated bagasse having about pH 9.6. Seed cultures of *Enterococcus faecalis* IFO 3791 and *Lactobacillus brevis* IFO 3345 were inoculated into a nutrient culture medium containing 100 parts by weight of the alkali-treated bagasse thus obtained and as nutrients 10 parts by weight of wheat flour bran, 10 parts by weight of de-fatted soybean, 5 parts by weight of corn meal, 10 parts by weight of molasses, 0.2 parts by weight of ammonium phosphate and 60 parts by weight of water, the mixture was fermented in a flexible bag at a room temperature for 2 days to obtain a fermented bagasse feed.

The bagasse feed, sufficiently digestible, is preferably suitable as a high-quality feed having an excellent taste for ruminants. It is advantageously feasible to increase the feed value of the bagasse feed and to produce a feed for monogastric animals like pigs and poultry by blending other nutrients to the fermented bagasse feed.

Example 5

Bagasse having a water content of about 45% was mixed with as alkaline reagents 2% calcium oxide and 2% sodium hydroxide to bagasse, d.s.b., respectively, and the mixture was allowed to stand overnight to obtain an alkali-treated bagasse having about pH 10.3. Seed cultures of *Enterococcus faecium* FERM BP-4504, *Lactobacillus rhamnosus* IFO 3532 and *Lactobacillus acidophilus* IFO 13952 were inoculated into a nutrient culture medium containing 100 parts by weight of the alkali-treated bagasse thus obtained as nutrients 20 parts by weight of wheat flour bran, 5 parts by weight of press-ground barley, 5 parts by weight of rice bran, 10 parts by weight of molasses, 5 parts by weight of milk serum and 70 parts by weight of water, the mixture was fermented in a flexible bag at a room temperature for 3 days to obtain a fermented bagasse feed.

The bagasse feed, sufficiently digestible, is preferably suitable as a high-quality feed having an excellent taste for ruminants. It is advantageously feasible to increase the feed value of the bagasse feed and to produce a feed for monogastric animals like pigs and poultry by blending other nutrients to the fermented bagasse feed.

Example 6

A fermented and dried bagasse feed was prepared by drying in hot air the fermented bagasse feed obtained by the method in Example 4 to obtain a fermented bagasse feed having a water content of 20%.

The bagasse feed, a high quality feed having sufficient digestibility, good taste and excellent in preservation, is suitable for long-distance transportation.

Example 7

Twenty cattle having body weight of 400 to 500 kg were fed for a period of 60 days by providing them with the bagasse feed obtained by the method of Example 4. The taste of the bagasse feed is preferable for the cattle, and they assimilate the bagasse feed of about 20 to 25 kg/body in a day and increase their body weights by about 2.1 kg/body in a day on an average in satisfactory physical and feeding conditions.

As described above, bagasse, an unutilized agricultural waste, is utilized according to the invention to prepare an alkali-treated bagasse by utilizing alkali reagents, and further a good digestible, preferable taste and high quality fermented bagasse feed is produced easily within a relatively-short period of time by inoculating lactic acid bacteria capable of proliferating in an alkaline nutrient culture medium of not less that pH 9.5 or in a nutrient culture medium containing 6.5% sodium chloride into the alkali-treated bagasse and fermenting the mixture.

Accordingly, the present invention saves sugar-refinery industries from the difficulties of treating industrial waste, and livestock farming industries from the shortage of roughage, and further is extremely significant in agriculture, industries of sweetening products, feed industries and livestock product processors. Furthermore, in the case of standing in global view of observing the earth overall, it is no exaggeration to say that the present invention established a novel technology to save our future facing an environmental disruption, an overflowing population and a food crisis by allowing to provide a vast amount of foodstuff like livestock and milk products from bagasse or unutilized biomass exhausted largely and annually, without any competition with our foods.

While there has been described what is at present considered to be the preferred embodiments of the invention, it will be understood the various modifications may be made therein, and it is intended to cover in the appended claims all such modifications as fall within the true spirits and scope of the invention.

We claim:

1. A fermented bagasse feed, which is prepared by incorporating a nutrient source and a seed culture of a lactic acid bacterium capable of proliferating in an alkaline nutrient culture medium of not less than pH 9.5 or in a nutrient culture medium containing 6.5 w/w % sodium chloride into a alkali-treated bagasse, and by fermenting the resultant mixture said alkali-treated bagasse being prepared by softening a bagasse with calcium oxide with or without sodium hydroxide while preventing the substantial decomposition of cellulose.

2. The fermented bagasse feed of claim 1, wherein said seed culture is one or more members selected from the group consisting of lactic acid bacteria of the genera *Enterococcus, Lactobacillus, Streptococcus* and *Pediococcus*.

3. The fermented bagasse feed of claim 2, wherein said lactic acid bacterium of the genus *Enterococcus* is *Enterococcus faecium* FERM BP-4504.

4. The fermented bagasse feed of claim 1, wherein said nutrient source is one or more members selected from the group consisting of energy sources, proteins, minerals and vitamins.

5. The fermented bagasse feed of claim 4, wherein said nutrient source is incorporated thereinto in an amount not exceeding the amount of said bagasse, on a dry solid basis.

6. A process for preparing a fermented bagasse feed, which comprises:

(a) incorporating a nutrient source and a seed culture of a lactic acid bacterium capable of proliferating in an alkaline nutrient culture medium of not less that pH 9.5 or in a nutrient culture medium containing 6.5 w/w % sodium chloride into an alkali-treated bagasse, prepared by softening a bagasse with calcium oxide with or without sodium hydroxide while preventing the substantial decomposition of cellulose and hemicellulose, and (b) fermenting the resultant mixture and recovering the resultant fermented bagasse.

7. The process of claim 6, wherein said seed culture in the step (a) is one or more members selected from the group consisting of lactic acid bacteria of the genera *Enterococcus, Lactobacillus, Pediococcus* and *Streptococcus*.

8. The process of claim 7, wherein said lactic acid bacterium of the genus *Enterococcus* is a member selected from the group consisting of bacteria of the species *Enterococcus casseliflavus, Enterococcus durans, Enterococcus faecalis, Enterococcus faecium,* and *Enterococcus hirae,* and said lactic acid bacterium of the genus *Lactobacillus* is a member selected from the group consisting of bacteria of the species *Lactobacillus rhamnosus, Lactobacillus plantatum, Lactobacillus sake, Lactobacillus acidophilus, Lactobacillus helveticus,* and *Lactobacillus brevis*.

9. A process for feeding livestock, which comprises:

(a) providing a fermented bagasse which is fermented by incorporating a nutrient source and a seed culture of a lactic acid bacterium capable of proliferating in an alkaline nutrient culture medium of not less that pH 9.5 or in a nutrient culture medium containing 6.5 w/w % sodium chloride into an alkali-treated bagasse, prepared by softening a bagasse with calcium oxide with or without sodium hydroxide while preventing the substantial decomposition of cellulose and hemicellulose, and (b) feeding livestock with the resultant fermented bagasse feed.

10. The process of claim 9, wherein said seed culture is one or more members selected from the group consisting of lactic acid bacteria of the genus *Enterococcus, Lactobacillus, Pediococcus* and *Streptococcus*.

11. The process of claim 10, wherein said lactic acid bacterium of the genus *Enterococcus* is a member selected from the group consisting of bacteria of the species *Enterococcus casseliflavus, Enterococcus durans, Enterococcus faecalis, Enterococcus faecium,* and *Enterococcus hirae,* and said lactic acid bacterium of the genus *Lactobacillus* is a member selected from the group consisting of bacteria of the species *Lactobacillus rhamnosus, Lactobacillus plantatum, Lactobacillus sake, Lactobacillus acidophilus, Lactobacillus helveticus,* and *Lactobacillus brevis*.

\* \* \* \* \*